Figure 1:
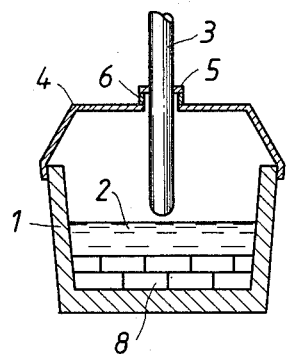

United States Patent [19]

Rappinger et al.

[11] 4,442,526
[45] Apr. 10, 1984

[54] ELECTRIC ARC FURNACE ARCING ELECTRODE SEAL

[75] Inventors: Bo Rappinger; Sven-Einar Stenkvist, both of Västerås, Sweden

[73] Assignee: ASEA AB, Västerås, Sweden

[21] Appl. No.: 369,619

[22] Filed: Apr. 19, 1982

[30] Foreign Application Priority Data

Apr. 21, 1981 [SE] Sweden ............................ 8102527

[51] Int. Cl.³ .............................................. H05B 7/12
[52] U.S. Cl. .................................................... 373/95
[58] Field of Search .................... 373/94, 95, 96, 101, 373/74, 69, 68

[56] References Cited

U.S. PATENT DOCUMENTS 783,736 2/1905 Seward ................................. 373/95
2,752,410 6/1956 Olsson .................................. 373/74

FOREIGN PATENT DOCUMENTS 1123801 2/1962 Fed. Rep. of Germany ........ 373/68

Primary Examiner—Roy N. Envall, Jr.
Attorney, Agent, or Firm—Kenyon & Kenyon

[57] ABSTRACT

An electric arc furnace has an electrically conductive roof with an electrode opening through which an arcing electrode depends with the opening closed around the electrode by an upstanding tubular electrically insulating refractory column surrounding the electrode and mounting on its top an electrically conductive electrode seal.

3 Claims, 2 Drawing Figures

U.S. Patent  Apr. 10, 1984  4,442,526

ELECTRIC ARC FURNACE ARCING ELECTRODE SEAL

An electric arc furnace usually has an electrically non-conductive roof forming one or more openings through which one or more arcing electrodes depend so as to form one or more arcs with a melt in the furnace hearth below the roof. Although the furnace bottom and side wall may be encased by a metal shell, the roof is dome shaped and built from refractory bricks electrically insulating each electrode.

A Svensson application Ser. No. 268,176, filed May 29, 1981, discloses a new electric arc furnace construction which has a flat roof comprising a metal superstructure which can be watercooled and from which a ceiling of refractory bricks is suspended. Consequently, the roof is electricaly conductive. For electrode insulation, the roof has a central portion entirely made of refractory bricks and which provides the opening or openings through which the electrode or electrodes depend. These bricks are not cooled by the superstructure and are closer to the melt than usual, because the roof is flat.

The above has the disadvantage that the electrically insulating bricks are unusually directly exposed to slag splashing and arc flare during operation of the furnace. The cooled ceiling bricks are more resistant to such conditions.

An electrode must be fed downwardly as its tip is consumed by the arc and its opening formed by the bricks has a periphery forming a space around the electrode through which the furnace gases, fumes and noise can escape from the furnace. To prevent this, a metal, water-cooled or graphite seal is used to seal this space, the seal being supported and electrically insulated by the bricks forming the electrode opening. Therefore, the seal is also usually directly exposed to slag splashing and arc flare in the case of the flat roof.

It is to be understood that for an AC arc furnace two or more electrodes are used, and for a DC arc furnace where the arcing power is carried through the melt in the hearth, only one, but possibly more, electrodes are used. Electrode insulation is required by either kind of furnace.

The object of the present invention is to provide an electrode seal for an electrically conductive roof, which reliably prevents arcing between the electrode or its seal and the roof, while avoiding the disadvantages referred to previously.

Briefly summarized, according to the invention the electrically conductive roof forms an opening through which the arcing electrode depends, with the opening having a periphery forming an adequate space around the electrode so as to prevent arcing between the roof and electrode when the furnace is operated. A refractory, electrically non-conductive, tubular column surrounds the electrode and extends upwardly, preferably vertically, from the opening's periphery so as to form an upwardly extending space around the electrode. An electrically conductive electrode seal is positioned around the electrode on the upper end of this column so as to close the upper end of the upwardly extending space. This seal is in electrical contact with the electrode and the column spaces the seal from the electrically conductive roof so as to prevent arcing between the shell and the furnace roof when the furnace is operated.

The column has an inside having a diameter not less than the diameter of the periphery of the electrode opening formed by the roof, and this periphery and the adjacent portion of the roof shields the inside of the column from direct exposure to the inside of the furnace below the roof. The column can be made of refractory brick or compound with the periphery or inner edge of the electrically conductive roof shielding the column's inside from slag splashing and arc flare. Because the column extends upwardly, preferably vertically, possible electrically conductive dust in the furnace's interior cannot collect on the column's inside surface to a degree causing arcing between the electrode's seal and the furnace roof. The column can easily support the weight of the seal and fix the seal against vertical movement with the electrode, because the column operates under axial loading.

Figure 2:
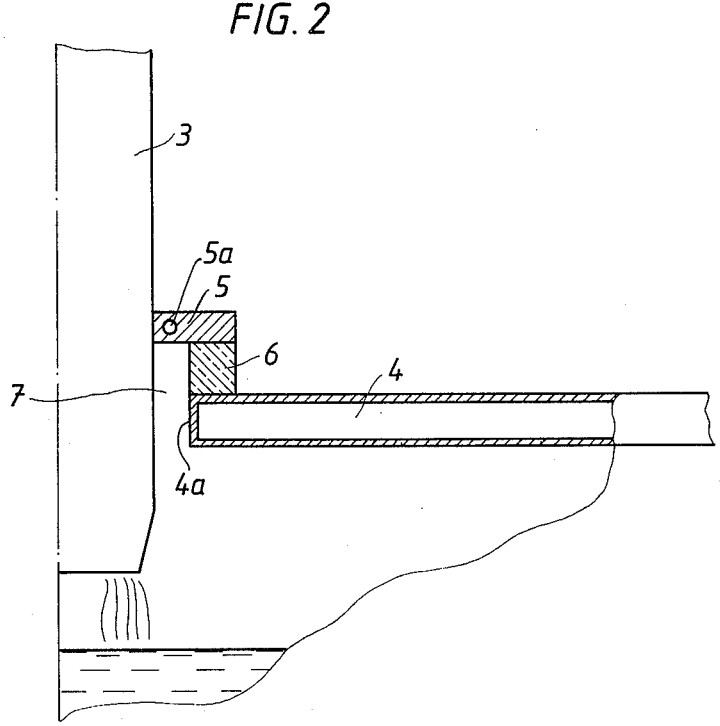

The accompanying drawings are for use in connection with the following detailed description of the invention, FIG. 1 schematically showing in vertical section a DC arc furnace embodying the invention; and FIG. 2 schematically showing in vertical section, on an enlarged scale, the details involved.

In the above drawings, the furnace vessel 1 contains a melt 2 with which an arcing electrode 3 arcs when the furnace is operating, the vessel having an electrically conductive roof 4 having an electrode opening 4a through which the arc depends, this opening having a periphery forming a space around the electrode proportioned so as to prevent arcing or flashover between the roof and the electrode. An electrically conductive seal 5 is positioned around the electrode and is supported above the roof by an electrically non-conductive tubular column 6 which surrounds the electrode and extends upwardly from the periphery 4a so as to form an upwardly extending space 7 around the electrode. The seal 5 is indicated at 5a as being water-cooled, and it is spaced by the column from the roof so as to prevent arcing or flashover with the roof when the furnace is operating.

The inside of the column 6 has a diameter not less than the diameter of the opening periphery 4a so as to cause the latter and the adjacent portion of the roof 4 to shield the column's inside from direct exposure to the inside of the furnace below the roof. The column 6 connects with the top of the roof 4 and the bottom of the seal 5 so as to prevent escape of gas or fumes from the space 7 and therefore from the furnace interior.

Preferably the periphery 4a of the roof opening is circular and the colum 6 is cylindrical and vertical, with the column 6 structurally supporting the seal 5 against vertical movement.

The seal 5 can be made of metal if water-cooled or graphite, and it must provide a sliding contact between itself and the electrode. The inside of the column does not extend closer to the electrode than does the periphery 4a of the water-cooled roof 4 so that the inside of the column is protected by the latter against direct arc flare, slag splashing, etc.; and because the column inside extends upwardly, preferably vertically, electrically conducting furnace dust does not deposit so as to possibly cause arcing between the seal 5 and the roof periphery 4a. The inside of the column 6 should be made as smooth as possible.

By dimensioning of the parts, the space 7 should separate the electrode 3 and its conductive seal 5 from the electrically conductive roof 4 far enough to prevent arcing or flashover. This, in turn, depends on the electrode voltage and mode of operation. The roof 4 is schematically illustrated as being only a hollow water-cooled metal disk, but with the understanding that it can be the metal superstructure from which the refractory brick sealing is suspended. In any event, the roof 4, being water-cooled, is very resistant to the conditions inside of the furnace.

FIG. 1 indicates DC furnace operation, the melt 2 being carried by electrically conductive bricks 8, the electric arcing power being supplied via these bricks 8 to the melt 2 and the electrode 3. In this case only one arcing electrode is required, although more may be used. In the case of AC operation, two or more electrodes must be used, and each may be provided with this new sealing arrangement when the furnace roof is electrically conductive. The electrically insulating refractory column 6 is inherently structurally strong and stable and can easily fix the seal 5 against vertical movement relative to the roof 4, the seal having a smooth surface contacting the electrode 3 and permitting free vertical movement of the latter.

I claim:

1. An electric arc furnace having an electrically conductive roof forming an opening through which an arcing electrode depends, the opening having a periphery forming a space around the electrode so as to prevent arcing between the roof and electrode when the furnace is operating, an electrically non-conductive tubular column surrounding the electrode and extending upwardly from said periphery and forming an upwardly extending space around the electrode, and an electrically conductive seal positioned around the electrode on the upper end of the column and closing the upper end of the upwardly extending space, the seal being water cooled and providing a sliding contact between itself and the electrode so that it is in electrical contact with the electrode and the column spacing the seal from the roof so as to prevent arcing between the seal and the furnace roof when the furnace is operating, said column having an inside diameter not less than the diameter of said periphery so as to cause the latter and the adjacent portion of said roof to shield said inside from direct exposure to the inside of the furnace below the roof.

2. The furnace of claim 1 in which said periphery is circular and said column is cylindrical and vertical.

3. The furnace of claim 2 in which said column structurally supports said seal.

* * * * *